(No Model.) 4 Sheets—Sheet 1.

C. A. GIBBS.
GRAIN MEASURING AND REGISTERING APPARATUS.

No. 529,068. Patented Nov. 13, 1894.

Witnesses:
Geo. H. Gibson
A. E. Delaney

Inventor:
Cyrenus A. Gibbs
by Mosher & Curtis
attys (No Model.) 4 Sheets—Sheet 3.
C. A. GIBBS.
GRAIN MEASURING AND REGISTERING APPARATUS.

No. 529,068. Patented Nov. 13, 1894.

Witnesses:
Geo. H. Gibson
A. E. Delaney

Inventor:
Cyrenus A. Gibbs
by Mosher & Curtis
Attys.

(No Model.) 4 Sheets—Sheet 4.
C. A. GIBBS.
GRAIN MEASURING AND REGISTERING APPARATUS.

No. 529,068. Patented Nov. 13, 1894.

Witnesses:
Geo. H. Gibson
A. E. Delaney

Inventor:
Cyrenus A. Gibbs
by Mosher & Curtis
attys.

UNITED STATES PATENT OFFICE.

CYRENUS A. GIBBS, OF SCHENECTADY, NEW YORK.

GRAIN MEASURING AND REGISTERING APPARATUS.

SPECIFICATION forming part of Letters Patent No. 529,068, dated November 13, 1894.

Application filed December 23, 1893. Serial No. 494,601. (No model.)

*To all whom it may concern:*

Be it known that I, CYRENUS A. GIBBS, a citizen of the United States, residing at Schenectady, county of Schenectady, and State of New York, have invented certain new and useful Improvements in Grain Measuring and Registering Apparatus, of which the following is a specification.

My invention relates to such improvements and consists of the novel construction and combination of parts hereinafter described and subsequently claimed.

Reference may be had to the accompanying drawings, and the letters of reference marked thereon, which form a part of this specification.

Similar letters refer to similar parts in the several figures herein.

Figure 1:
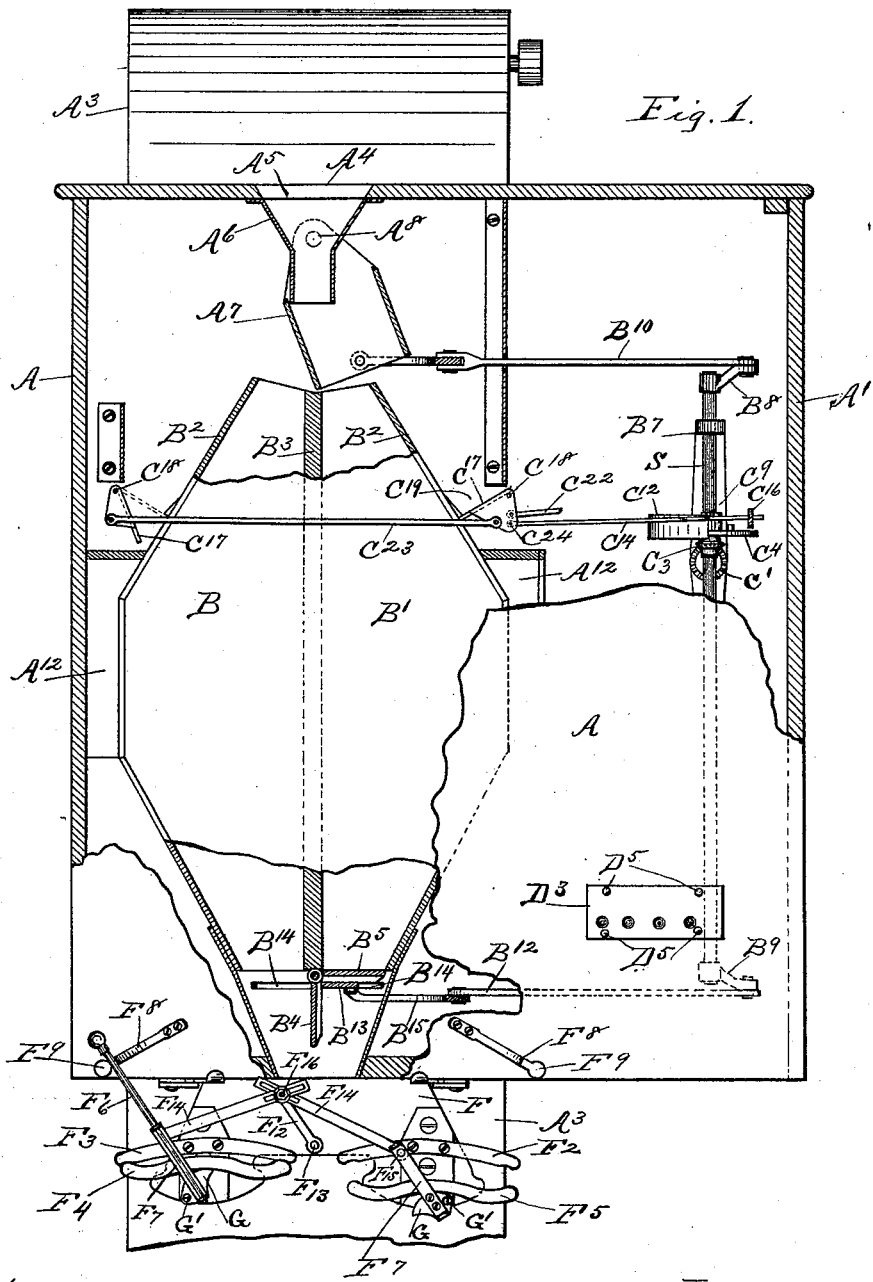
Figure 2:
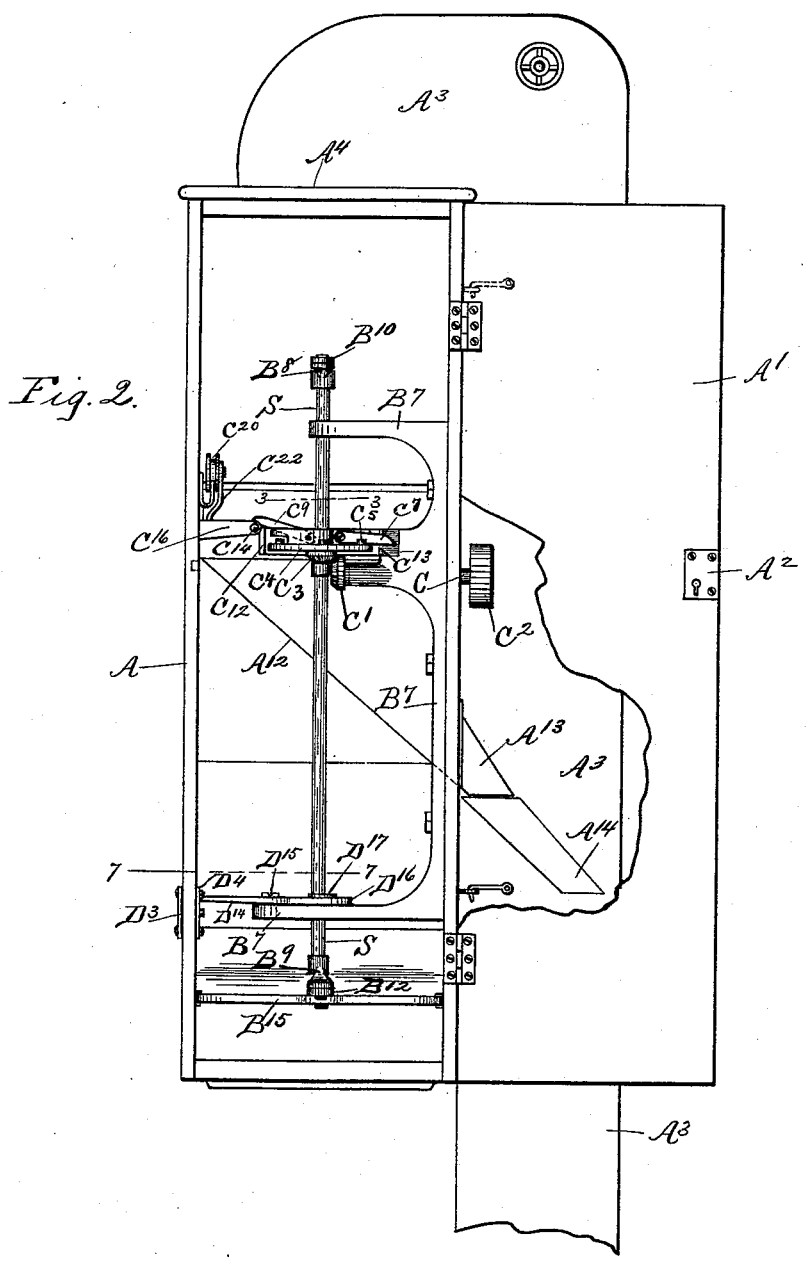
Figure 3:
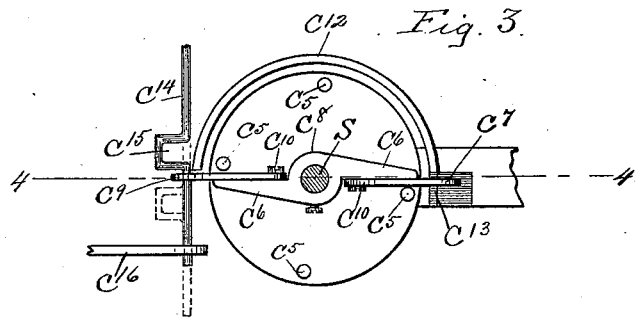
Figure 4:
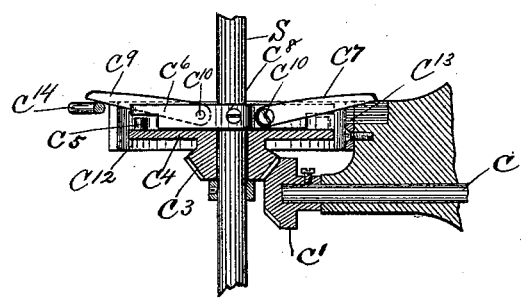
Figure 5:
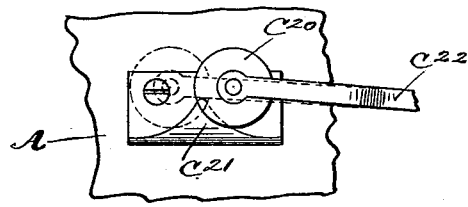
Figure 6:
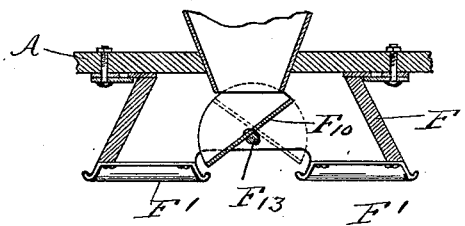
Figure 7:
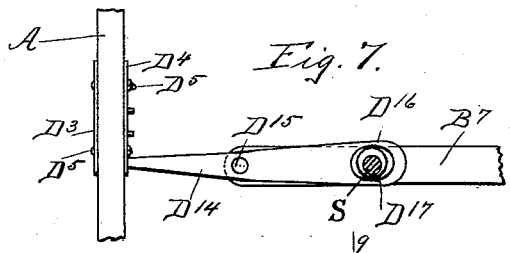
Figures 8, 9:
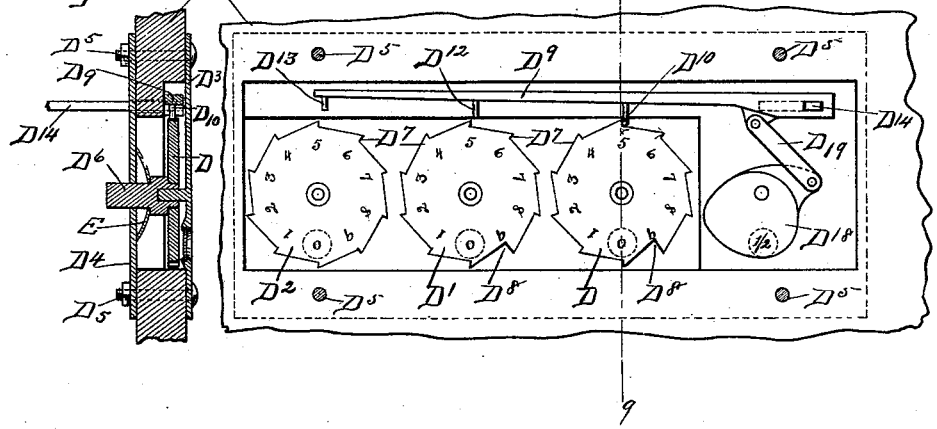

Figure 1 is a front elevation of my improved apparatus with portions of the inclosing case broken away to show the location of the interior parts. Fig. 2 is a view in elevation of the right-hand side of the apparatus as seen in Fig. 1, with the side door opened and the bag-holder removed. Fig. 3 is a horizontal cross-section on the broken line 3—3, in Fig. 2, showing the intermitting-grip mechanism in plan. Fig. 4 is a central vertical section of the mechanism shown in Fig. 3, taken on the broken line 4—4, in that figure. Fig. 5 is a view in elevation of the inner side of a portion of the case-wall showing the weighted wheel for controlling the overflow-levers, and the inclined runway for the same. Fig. 6 is a central vertical section taken longitudinally of the case-bottom and bag-holding mechanism. Fig. 7 is a horizontal cross-section taken on the broken line 7—7, in Fig. 2, showing the cam-lever mechanism for operating the register, in plan. Fig. 8 is an enlarged view in front elevation of the registering mechanism, with the apertured front-plate removed, and its position indicated by dotted lines. Fig. 9 is a vertical cross-section of the same taken on the broken line 9—9, in Fig. 8.

The object of my invention is to provide an apparatus for measuring, bagging and registering grain delivered thereto, and more especially an apparatus which may be secured to the elevator of a thrashing machine to measure, bag and register the grain as it is thrashed and delivered from the machine through the elevator to the apparatus.

A— is an inclosure or case which contains and supports the various mechanisms for measuring, bagging and registering the grain. The case is provided at one end with a door $A'$— having a lock $A^2$— by which the inclosed mechanism can be protected from malicious or fraudulent manipulation.

$A^3$— represents an elevator of a thrashing machine to which the case is secured so that the grain will be delivered from the elevator, as at $A^4$— to the upper side of the case, as seen in Figs. 1 and 2. The elevator may be in any known form, and I have not shown or described the interior elevating mechanism, it being sufficient for a full understanding of my invention as hereinafter described, to indicate the position of my improved apparatus relatively to the elevator.

The case is provided in its upper wall with the inlet opening $A^5$— leading to the fixed hopper-chute $A^6$— which communicates with the two subjacent valved hoppers B—, and $B'$. These two hoppers are formed by the vertical, opposite side-walls of the case and the transverse walls $B^2$—, $B^3$—, as shown partly by dotted lines. The wall $B^3$— is a vertical partition wall between the hopper-chambers. The chambers so formed are of equal capacity, which is known, being preferably adapted to contain one half-bushel each. The hoppers are filled and discharged alternately, the supply being controlled by upper inlet-valves, and the discharge by lower outlet-valves. The inlet-valves are shown in the form of an oscillating supply-chute $A^7$— pivoted at its upper end to the side-walls of the case at $A^8$—, and communicating at its upper end with the fixed hopper-chute. When the lower end of the oscillating chute is swung from one hopper to the other, it has the valve-function of closing one hopper and opening the other to the supply.

The outlet, or discharging, valves $B^4$— and $B^5$— are shown in the form of hinged drop-valves at the bottom of the hoppers.

As a means for alternately opening and closing the hopper-valves, I provide a vertical shaft S— rotary in suitable bearings in the bracket $B^7$— fixed upon a vertical side-wall of the case, as shown in Fig. 2. The cranks $B^8$— and $B^9$— are fixed upon the shaft, the upper crank $B^8$— being connected by link $B^{10}$— with the oscillatory chute, and the lower crank $B^9$— by link $B^{12}$— and yoke $B^{15}$— with the slide-bar $B^{13}$— movable transversely from one outlet valve to the other. Each end of the slide-bar travels in a horizontal slot or groove $B^{14}$— made in the vertical side-wall of the case, which slots form a slideway-guide for the ends of the slide-bar. As the slide-bar is moved from beneath the valve $B^5$— shown closed in Fig. 1, it engages the other valve $B^4$— and closes it, while the released valve $B^5$— swings open by gravity. The two cranks are secured to their supporting shaft in line with each other on the same side of the shaft, so that the outlet valve of hopper B— is closed and the outlet valve of hopper B'— is opened at the same time the oscillatory chute is swung from communication with hopper B'— into communication with hopper B—, whereby the hopper B'— is being discharged through its bottom opening while the other hopper is being filled.

As a means for automatically operating all of the hopper-valves, I provide a continuous motor consisting of the shaft C— rotary in suitable bearings in the bracket $B^7$— and having fixed on its inner end a beveled gear C'—, and on its outer end the drive-pulley $C^2$—. The drive-pulley is belted to some continuous power, for example a pulley fixed to some running shaft of the thrashing-machine, not shown. The beveled gear C'— engages a similar gear $C^3$— loose on the vertical shaft S—, and provided with a circular plate or hub $C^4$— fixed to turn with such latter gear. The hub-plate is provided with four equidistant studs $C^5$— erected from the upper side of the plate. The vertical shaft is provided with a pair of oppositely projecting arms $C^6$— radiating from the hub $C^8$— fixed upon the vertical shaft, to turn therewith. The radial arms are provided with trip-latches $C^7$— and $C^9$—, one pivoted upon each arm as at $C^{10}$—. When the trip-latches are uncontrolled they drop by gravity into the path of the studs $C^5$— and one of them is engaged by one of the studs, whereby a rotary movement is communicated to the hub $C^8$—, and through the hub to the vertical shaft; but when the trip-latches are held above the path of the studs in the position shown in Fig. 4, they are not engaged by the studs, and the vertical shaft remains at rest while the gear-wheels both have a continuous movement. The trip-latches and studs are, therefore, parts of a grip-mechanism.

As a means for automatically intermitting the grip, I place around the studded hub-plate on one side just within the path of the oscillatory ends of the latches, a slideway $C^{12}$— having its end first engaged by the latches inclined to form an ascending plane as shown at $C^{13}$—. As the latch engaged by any one of the studs ascends this incline, it is lifted above the path of the studs and out of engagement therewith, so that the vertical shaft comes to a rest while the beveled gears continue to move.

In Figs. 3 and 4, one latch $C^7$— is shown at rest over the incline $C^{13}$—, while the other latch $C^9$— has passed over the slideway $C^{12}$— in an elevated position, and come to rest on the detent $C^{14}$—. This detent is a piece of wire bent to form an opening $C^{15}$—, and movable lengthwise in a bearing formed in the end of bracket $C^{16}$—. When the wire is moved lengthwise until the opening $C^{15}$— reaches the latch $C^9$—, the latch falls by gravity through the opening and into the path of the continually moving studs, the first one of which engages the latch and carries it around to the ascending incline, where it is disengaged as before explained. Meanwhile the vertical shaft has rotated half-way around, a movement just sufficient to operate all the hopper-valves in one direction, and the latch $C^7$— has taken the position occupied by the latch $C^9$— in Fig. 3, and is supported by the detent on the opposite side of the opening $C^{15}$—. It is only necessary, therefore, to slide the detent back and forth to make the grip intermitting and operate the valves in both directions to open and close them. Such slide-movement of the detent can be accomplished at any time by the hand of the operator; but to insure accuracy and honesty of measurement, I provide mechanism for operating the detent automatically, consisting of a weighted, or spring-controlled, overflow-valve to which the detent is secured, and by which it is operated.

As a preferred form of overflow-lever, I have shown a cross-board or leaf $C^{17}$— pivoted at each end, at or near its upper edge, to the vertical side-walls of the case, and a short distance from the inlet of the valved hoppers, as at $C^{18}$—, one lever for each hopper. When the lower end of such cross-board is swung up against the hopper-wall, as shown in connection with hopper B'—, it forms a pocket $C^{19}$— adapted to catch any overflow of grain passing through the oscillatory chute after the hopper in connection with the chute is filled. The lower edge of the cross-board or lever is held in contact with the hopper-wall by means of the weighted wheel $C^{20}$— traveling on the double-incline track $C^{21}$—, and connected by link $C^{22}$— with the overflow-levers. The two levers are connected by link $C^{23}$— and when the weight of the overflow grain in pocket $C^{19}$— is sufficient to force the weighted wheel over from the ascending to the descending incline, the overflow grain in the pocket escapes but the weighted wheel on the descending incline serves to continue the movement of the connected overflow levers until the lever adjacent to hopper B— swings into contact with that hopper to form an overflow pocket, in which position the lever is held by the weighted wheel until the overflow from hopper B— reverses the position of the levers and controlling weighted wheel.

By connecting the detent $C^{14}$—, as at $C^{24}$—, with the connections between the levers and weighted wheel, the grip-mechanism is automatically operated each time either hopper overflows, whereby the overflow from either hopper serves to open the outlet valve of that hopper, and at the same time to swing the oscillatory chute into communication with the empty hopper and close its outlet valve. The overflow grain passes from the pockets $C^{19}$— into chutes $A^{12}$—formed between the vertical walls of the case and the hopper-walls, which chutes lead to outlets $A^{13}$— through the side-wall of the case, and communicate with side-openings leading into the elevator at $A^{14}$—, whereby the overflow grain is carried back by the elevator into the hoppers B and B'—.

The registering mechanism comprises a series of index-dials, D—, D', $D^2$— three being shown, each having a peripheral ratchet and rotarily mounted upon a separate support. The dials are inclosed between a front-plate $D^3$— and a back-plate $D^4$—, the plates being secured together by bolts $D^5$— passing through the case-wall. The front-plate has an inspection aperture opposite the lower side of each dial, for reading the register. Each dial is secured upon a shaft $D^6$— having bearings on both the front and back plates, and such shaft projects through the back-plate interiorly of the case, where it is accessible for the purpose of adjusting the register before the operation of the device is begun. Besides the ratchet $D^7$— each dial, except that of highest denomination, shown at the left in Fig. 8, has a peripheral recess $D^8$— between two of its ratchet-teeth.

$D^9$— is a pawl extending above the dials in the same vertical plane therewith, and provided with a ratchet-engaging member for each dial. Such members are in the form of pins or fingers $D^{10}$—, $D^{12}$—, $D^{13}$—, depending from the pawl. The engagement of the pawl $D^{10}$— with the ratchet on dial D— maintains the pawl in an elevated position with the members $D^{12}$— and $D^{13}$— out of engagement with their respective dials, until the member $D^{10}$— enters the recess $D^8$— in its dial, whereupon the pawl falls until its member $D^{12}$—, engages the ratchet on dial D'—. When in such last mentioned position, the pawl is held in a partly elevated position out of engagement with the ratchet-dial $D^2$— until the member $D^{12}$—enters the recess D'— in dial D'—, whereupon the pawl is allowed to fall until its remaining member $D^{13}$— engages the ratchet on dial $D^2$— to operate the same. Each dial of a higher denomination is thus moved by the pawl through the space between two neighboring ratchet teeth at every revolution of the dial of next lower denomination, that is as often as the pawl-member enters the recess $D^8$— in such lower dial; and the dials are each provided with index numerals arranged in series, one for each ratchet-tooth, whereby the exposed index numeral on any dial of higher denomination denotes the total revolutions of the next lower dial. The pawl is reciprocated by the lever $D^{14}$— pivoted at $D^{15}$— upon the lower arm of bracket $B^7$—, with one end in operating engagement with the pawl, and provided at its other end with a cam-follower $D^{16}$— inclosing a cam $D^{17}$— fixed on a vertical shaft.

$D^{18}$— is a dial-lever having thereon the fractional index-character ½, and connected by the link $D^{19}$— with the pawl. The forward movement of the pawl operates the dial D— and at intervals the other ratchet-dials, as above explained, while in its return movement the pawl slips over the ratchet-teeth without operating them, but operates the dial-lever $D^{18}$— to move its index-character opposite the inspection aperture in the front-plate. The reciprocating movements of the pawl are thus registered alternately by the dial-lever and ratchet-dials.

E— is a spring-washer bearing upon the dial-shaft $D^6$— to prevent accidental movement of the dial. Each complete rotation of the vertical shaft which is caused by the successive filling and overflowing of both hoppers thus imparts a complete forward and return movement to the pawl, and the capacity of the hoppers being known as one-half bushel each, the register will indicate the number of bushels that have passed through the hoppers. The register can also be used to indicate the number of bags of grain delivered, and for this purpose I provide my apparatus with a bag-holder.

I have shown an open frame F— detachably secured to the bottom of the case A— to register with the outlet from the hoppers. The frame is provided on one side with a pair of flanges F'— for supporting one side of a bag each, and on its opposite side with a pair of clamps adapted to hold the bags upon the flanges F'— alternately.

$F^2$— and $F^3$— are a pair of fixed clamp-sections secured upon the side of the open frame, and $F^4$— and $F^5$— are a pair of movable clamp-sections respectively engageable with the fixed clamp-sections. Each movable clamp-section is operated by means of a cam G— pivotally secured at G'— to the supporting frame and provided with an operating handle-lever $F^6$— mounted upon a bracket $F^7$— secured to the cam.

In Fig. 1, the handle for the cam which operates the clamp-section $F^5$— is omitted, to better show the bracket.

Each handle-lever is adapted to engage a spring-stop $F^8$— secured upon the side of the case A— in the path of such lever; and having a thumb-piece $F^9$— whereby the spring can be depressed to release the handle-lever from the stop. The frame is provided with a valve $F^{10}$— controlling the opening therein, and oscillated by means of the crank $F^{12}$— and shaft $F^{13}$—. The valve-crank and both cam-lever-brackets are connected by the slotted links $F^{14}$— each pivoted at one end at $F^{15}$— to a bracket and at the other end to the wrist-pin F¹⁶— of the crank. A movement of either cam or handle will thus operate both clamps, opening one and closing the other, and simultaneously operate the valve; and bags can thus be held upon the flanges F'— alternately and released therefrom while the flow of grain is automatically shut off from the filled and released bag and transferred to the empty bag held by the other clamp. Each movable clamp-section is freely supported intermediately of its ends by its cam, and is self-adjusting to accommodate itself to folds or inequalities in the bag-fabric.

By dividing the number of bushels indicated by the register by the number of bushels contained in a bag, I can ascertain from the register the number of bags filled by my apparatus.

I am aware that a pivoted packer supported from a bail and driven from a crank shaft by a connecting rod so that when the grain accumulates in the feed-throat and produces a resistance under the pivoted packer the shaft and a detent will be lifted with the effect to shift a grain guiding valve or plate and such device I do not claim.

What I claim as new, and desire to secure by Letters Patent, is—

1. In a grain-measuring and registering apparatus, the combination with a pair of valved hoppers, valve-operating mechanism, a continuous motor, an intermittent-grip between the motor and valve-operating mechanism, and grip-actuating over-flow levers situated outside the hoppers and adapted to be operated by the weight of the overflow grain, of a registering device, and operating connections between such device and the valve-operating mechanism, and bag-holding mechanism at the outlet openings of the hoppers, substantially as described.

2. In a grain-measuring apparatus, the combination with a pair of valved hoppers, valve-operating mechanism, and a continuous motor, of an intermitting grip between the motor and valve-operating mechanism, and grip-actuating overflow situated outside of the hoppers and adapted to be operated by the weight of the overflow grain, substantially as described.

3. In a grain-measuring apparatus, the combination with a pair of valved hoppers, a supply-conveyer, valve-operating mechanism, and a continuous motor, of an intermitting grip between the motor and valve-operating mechanism, grip-actuating overflow situated outside the hoppers and adapted to be operated by the weight of the overflow grain, and overflow chutes leading downward from such levers to the supply-conveyer, substantially as described.

4. In a grain-measuring apparatus, the combination with a pair of hoppers, an oscillatory supply-chute situated above and constituting no part of said hoppers, outlet valves, mechanism for operating the chute and outlet valves, and a continuous motor, of an intermitting grip between such operating mechanism and the motor, and a pair of grip-actuating overflow levers, one for each hopper, substantially as described.

5. In a bag-holder, the combination of frame F or the like, devices for directly feeding grain into a bag, a clamp-section fixed to the frame, a movable clamp-section engageable with the fixed clamp-section, a lever-actuated operating cam in engagement with the movable clamp-section intermediate its ends and the lever whereby the grain feeding devices and the bag clamping sections are operated simultaneously, substantially as set forth.

6. In a bag-holder, the combination of frame F or the like, devices for directly feeding grain into a bag, a clamp-section fixed to the frame, of a movable clamp-section engageable therewith, an operating cam in engagement with the movable clamp-section intermediate its ends, a lever for operating the cam, and a spring-stop in the path of the lever, substantially as set forth.

In testimony whereof I have hereunto set my hand this 7th day of December, 1893.

C. A. GIBBS.

Witnesses:
GEO. A. MOSHER,
FRANK C. CURTIS.